US012739611B2

(12) United States Patent
Chikatmarla et al.

(10) Patent No.: US 12,739,611 B2
(45) Date of Patent: Sep. 15, 2026

(54) NETWORK INTERWORKING SYSTEMS AND METHODS

(71) Applicant: Boost SubscriberCo L.L.C., Englewood, CO (US)

(72) Inventors: Jaya Chandra Chikatmarla, Highlands Ranch, CO (US); Kumar Anshuman, Highlands Ranch, CO (US); Sruthi Nair, Aurora, CO (US); Dawood Shahdad, Aurora, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 202 days.

(21) Appl. No.: 18/898,182

(22) Filed: Sep. 26, 2024

(65) Prior Publication Data

US 2026/0089481 A1 Mar. 26, 2026

(51) Int. Cl.
*H04W 8/06* (2009.01)

(52) U.S. Cl.
CPC .................................... *H04W 8/06* (2013.01)

(58) Field of Classification Search
CPC .................................. H04W 8/06; H04W 8/12
USPC ...................................................... 455/432.1
See application file for complete search history.

(56) References Cited

U.S. PATENT DOCUMENTS

2008/0070570 A1* 3/2008 Jiang ...................... H04W 4/24 455/433
2017/0134929 A1* 5/2017 Semama ......... H04W 36/00224

* cited by examiner

*Primary Examiner* — Don N Vo
(74) *Attorney, Agent, or Firm* — Kipman T. Werking; Frontier IP Law PLLC

(57) ABSTRACT

A disclosed method may include transmitting, by a UDM function based on determining that a network interworking support database contains VLR information for a UE associated with a legacy network, a deregistration request to a Home Location Register (HLR) of a mobile network such that an HLR clears the VLR information of the UE from the network interworking support database and sends a cancellation message to a VLR of a legacy network to remove registration information for the UE such that the mobile network avoids redirecting a call for the UE to the legacy network after the UE has returned to a coverage area of the mobile network after roaming in a coverage area of the legacy network.

20 Claims, 10 Drawing Sheets

Network Interworking Support Database Structure and VLR Information Clearing Process

Deregistration Request and Cancellation Message Flow in 5G to 3G Interworking

VLR Information Persistence Scenarios and Resolution Process

NETWORK INTERWORKING SYSTEMS AND METHODS

BRIEF SUMMARY

This disclosure is generally directed to systems, methods, and computer-readable media relating to network interworking in the context of mobile telecommunications. Mobile network operators face significant challenges in managing subscriber information across different network generations, particularly as they transition from legacy systems to more advanced technologies. One of the primary issues arises when subscribers move between networks with different capabilities and architectures, such as from 3G to 5G networks. In these scenarios, outdated subscriber information may persist in various network elements, potentially leading to inefficiencies in call routing, service delivery, and resource allocation.

For instance, when a subscriber returns to their home 5G network after roaming on a legacy 3G network, their registration information may remain in the Visitor Location Register (VLR) of the 3G network. This stale data may cause several problems. It may result in unnecessary signaling between network elements as the system attempts to route calls or services through the outdated path. Additionally, it may lead to failed call attempts or delayed service delivery as the network initially tries to reach the subscriber through the incorrect network. These issues may negatively impact the user experience and increase the operational load on the network.

Furthermore, the complexity of managing subscriber data increases with the coexistence of multiple network generations. Each generation may have its own data structures, protocols, and network elements for handling subscriber information. Ensuring consistency and accuracy across these diverse systems presents a significant technical challenge. The problem is compounded by the dynamic nature of mobile networks, where subscribers frequently move between different coverage areas and network technologies.

To address these challenges, mobile network operators may implement a system that proactively manages subscriber information across different network generations. This system may leverage the capabilities of modern network functions, such as the User Data Management (UDM) function in 5G networks, to coordinate with legacy elements like the Home Location Register (HLR). By implementing a comprehensive technique to subscriber data management, operators may ensure that registration information is promptly updated when subscribers transition between networks.

The system may initiate a deregistration process when a subscriber moves from a legacy network to an advanced network. This process may involve clearing outdated information from relevant network elements and databases, such as removing VLR entries associated with the subscriber's previous location in the legacy network. Additionally, or alternatively, the system may send cancellation messages to inform legacy network elements that the subscriber has moved, preventing them from attempting to route calls or services through outdated paths.

By implementing such a system, mobile network operators may potentially improve the efficiency of their networks, enhance the subscriber experience, and reduce the operational overhead associated with managing multiple network generations. This technique may enable smoother transitions for subscribers moving between different network technologies, ensuring that they may access services seamlessly regardless of their location or the network generation they are connected to. Moreover, this system may provide a foundation for future network evolutions, enabling operators to more easily integrate new technologies while maintaining backward compatibility with existing infrastructure.

In some examples, a method may include (i) accessing, by a User Data Management (UDM) function of a mobile network, in response to receiving a registration request from a User Equipment (UE), a network interworking support database that supports interworking between the mobile network and a legacy network that operates using a mobile network standard for a specific subscriber in a roaming scenario that is of an earlier generation than the mobile network primarily uses for the specific subscriber, (ii) determining, by the UDM function, whether the network interworking support database contains Visitor Location Register (VLR) information for the UE associated with the legacy network, and (iii) transmitting, by the UDM function based on determining that the network interworking support database contains VLR information for the UE associated with the legacy network, a deregistration request to a Home Location Register (HLR) of the mobile network such that the HLR clears the VLR information of the UE from the network interworking support database and sends a cancellation message to a VLR of the legacy network to remove registration information for the UE such that the mobile network avoids redirecting a call for the UE to the legacy network after the UE has returned to a coverage area of the mobile network after roaming in a coverage area of the legacy network.

In some examples, the registration request is received from an Access and Mobility Management Function (AMF) of the mobile network.

In some examples, accessing the network interworking support database comprises performing a database read operation to retrieve Subscriber Permanent Identifier (SUPI), mobility, Serving GPRS Support Node (SGSN), and VLR information.

In some examples, the mobile network comprises a 5G network and the legacy network comprises a 3G network.

In some examples, the registration request comprises an IMS (IP Multimedia Subsystem) registration request.

In some examples, the method further comprises performing an IMS registration for the UE after clearing the VLR information.

In some examples, the registration request comprises a location update request.

In some examples, the deregistration request comprises a NUDM_UECM_DeregistrationNotification including VLR information comprising a VLR number, a Local Mobile Subscriber Identity (LMSI), a Mobile Application Part (MAP) version, and a cancellation type.

In some examples, the cancellation message sent to the VLR comprises a Cancel Location message.

In some examples, the deregistration request prevents a Service Centralization and Continuity Application Server (SCC-AS) from performing a Terminating Access Domain Selection (T-ADS) query based on the cleared VLR information.

In some examples, clearing the VLR information prevents generation of a Provide Roaming Number (PRN) response for the UE.

In some examples, the method improves interworking between 5G and 3G networks.

In some examples, the method further comprises updating a Home Subscriber Server (HSS) to reflect the cleared VLR information.

In some examples, the VLR information remains in the network interworking support database based on the UE failing to deregister from the legacy network due to loss of coverage or battery depletion.

In some examples, the VLR information remains in the network interworking support database based on a Mobile Switching Center (MSC) of the legacy network failing to send a purge request.

In some examples, the method further comprises performing a Lightweight Directory Access Protocol (LDAP) update to delete VLR and SGSN address information from the network interworking support database.

In some examples, a non-transitory computer-readable medium has instructions stored thereon that, when executed by at least one physical computing processor, cause a computing device to perform operations comprising: (i) accessing, by a User Data Management (UDM) function of a mobile network, in response to receiving a registration request from a User Equipment (UE), a network interworking support database that supports interworking between the mobile network and a legacy network that operates using a mobile network standard for a specific subscriber in a roaming scenario that is of an earlier generation than the mobile network primarily uses for the specific subscriber, (ii) determining, by the UDM function, whether the network interworking support database contains Visitor Location Register (VLR) information for the UE associated with the legacy network, and (iii) transmitting, by the UDM function based on determining that the network interworking support database contains VLR information for the UE associated with the legacy network, a deregistration request to a Home Location Register (HLR) of the mobile network such that the HLR clears the VLR information of the UE from the network interworking support database and sends a cancellation message to a VLR of the legacy network to remove registration information for the UE such that the mobile network avoids redirecting a call for the UE to the legacy network after the UE has returned to a coverage area of the mobile network after roaming in a coverage area of the legacy network.

In some examples, a system comprises at least one physical computing processor of a computing device and a non-transitory computer-readable medium that has instructions stored thereon that, when executed by the at least one physical computing processor, cause the computing device to perform operations comprising: (i) accessing, by a User Data Management (UDM) function of a mobile network, in response to receiving a registration request from a User Equipment (UE), a network interworking support database that supports interworking between the mobile network and a legacy network that operates using a mobile network standard for a specific subscriber in a roaming scenario that is of an earlier generation than the mobile network primarily uses for the specific subscriber, (ii) determining, by the UDM function, whether the network interworking support database contains Visitor Location Register (VLR) information for the UE associated with the legacy network, and (iii) transmitting, by the UDM function based on determining that the network interworking support database contains VLR information for the UE associated with the legacy network, a deregistration request to a Home Location Register (HLR) of the mobile network such that the HLR clears the VLR information of the UE from the network interworking support database and sends a cancellation message to a VLR of the legacy network to remove registration information for the UE such that the mobile network avoids redirecting a call for the UE to the legacy network after the UE has returned to a coverage area of the mobile network after roaming in a coverage area of the legacy network.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
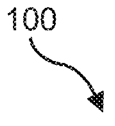
FIG. 1 shows an example flow diagram for a method relating to managing subscriber information across different network generations.
Figure 1:
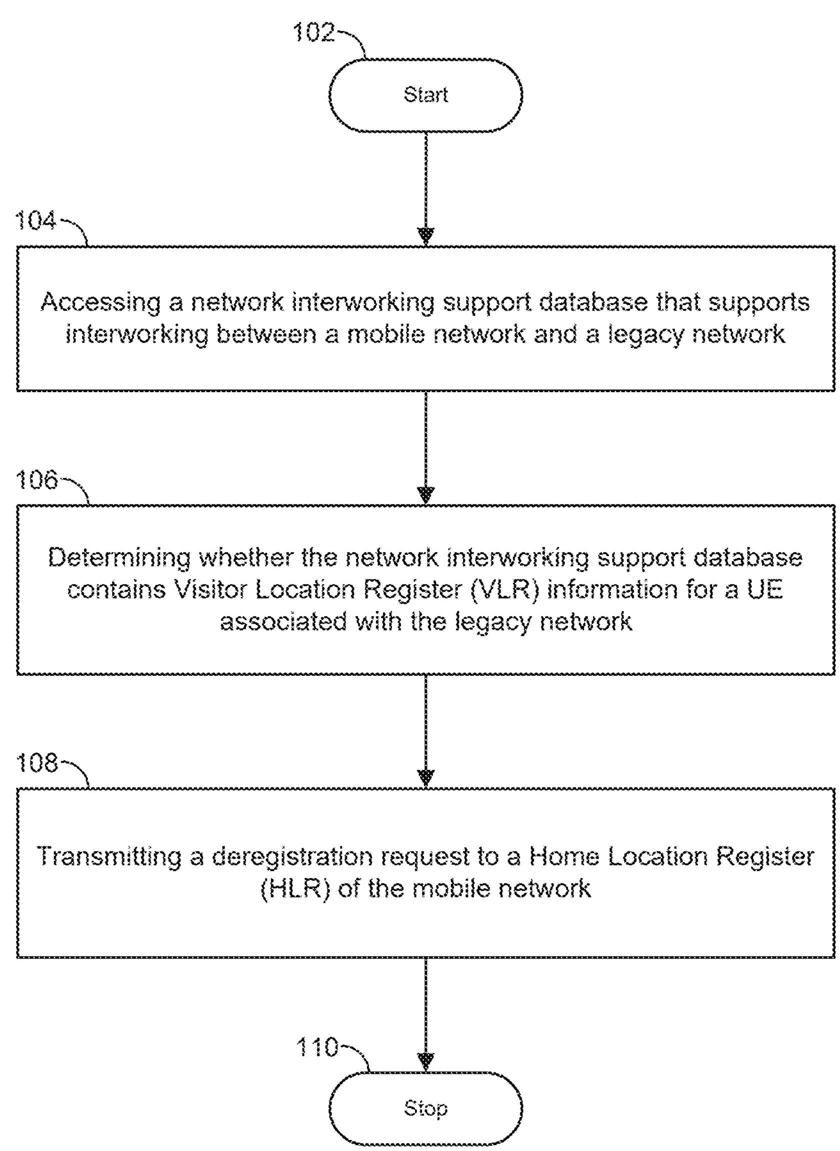

FIG. 1 shows a flow diagram for a method 100 relating to network interworking. At step 102, method 100 starts. At step 104, method 100 includes accessing, by a User Data Management (UDM) function of a mobile network, in response to receiving a registration request from a User Equipment (UE), a network interworking support database that supports interworking between the mobile network and a legacy network that operates using a mobile network standard for a specific subscriber in a roaming scenario that is of an earlier generation than the mobile network primarily uses for the specific subscriber. At step 106, method 100 includes determining, by the UDM function, whether the network interworking support database contains Visitor Location Register (VLR) information for the UE associated with the legacy network. At step 108, method 100 includes transmitting, by the UDM function based on determining that the network interworking support database contains VLR information for the UE associated with the legacy network, a deregistration request to a Home Location Register (HLR) of the mobile network such that the HLR clears the VLR information of the UE from the network interworking support database and sends a cancellation message to a VLR of the legacy network to remove registration information for the UE such that the mobile network avoids redirecting a call for the UE to the legacy network after the UE has returned to a coverage area of the mobile network after roaming in a coverage area of the legacy network. At step 110, method 100 ends.

Figure 2:
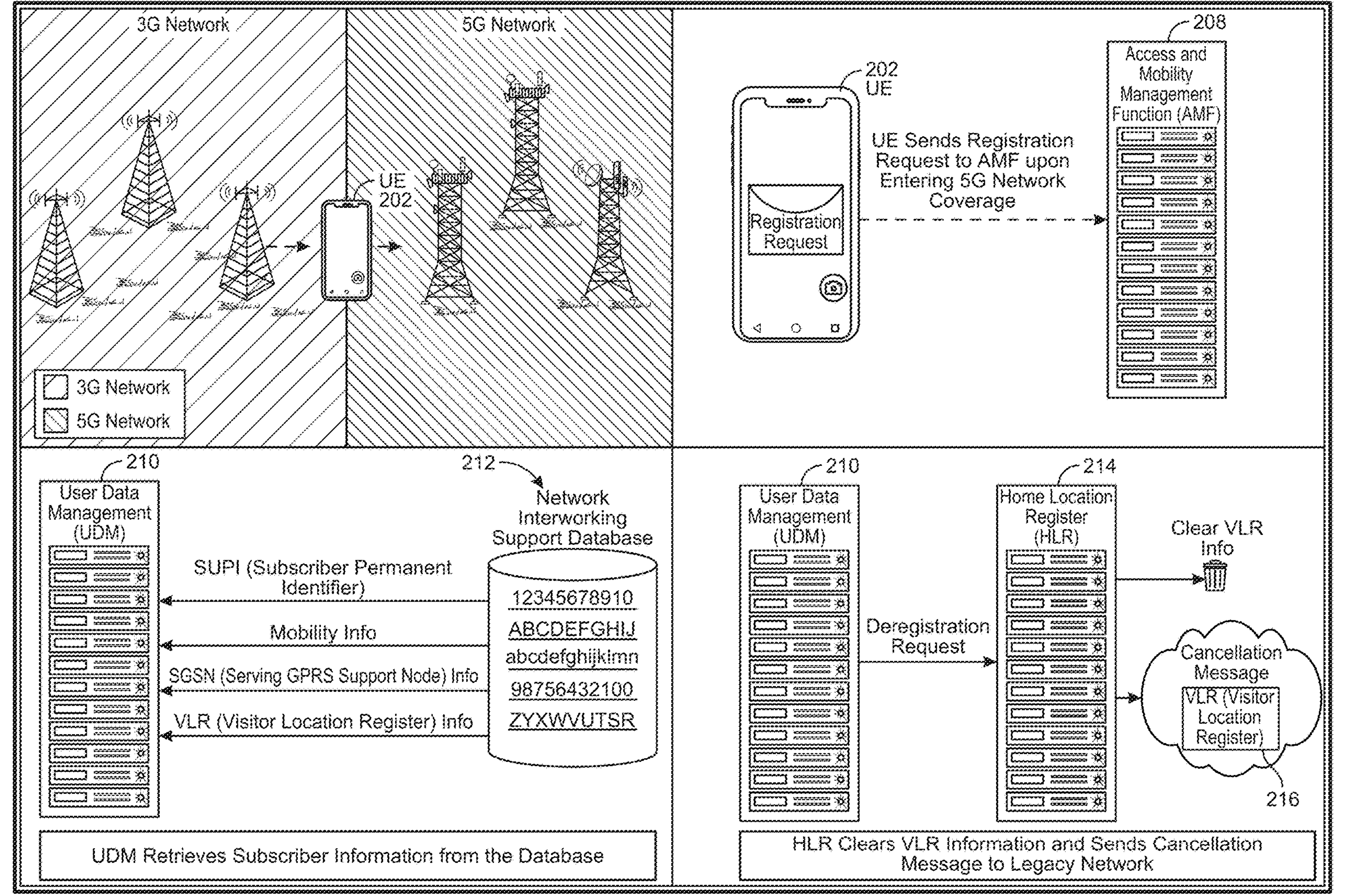
FIG. 2 illustrates an example multi-panel representation of a User Equipment (UE) registration and Visitor Location Register (VLR) information clearing process in a mobile network environment.

FIG. 2 illustrates a multi-panel representation of an example User Equipment (UE) registration and Visitor Location Register (VLR) information clearing process in a mobile network environment. This figure helps to visualize certain steps involved in managing subscriber information across different network generations, particularly when a subscriber moves from a legacy network to a more advanced network. The figure is divided into four panels, each depicting a different aspect of the process.

The first panel (top-left) of FIG. 2 depicts a landscape divided into two distinct areas, representing different network coverage zones. On the left side, an area labeled "3G Network" is shown with scattered tower-like structures representing 3G cellular towers. This area is distinguished by a light diagonal hatching pattern. On the right side, an area labeled "5G Network" is illustrated with more modern, sleeker tower structures representing 5G cellular towers. This area is differentiated using a cross-hatching pattern. In the center of this panel, User Equipment (UE) 202 is depicted as a smartphone. UE 202 represents the device used by a subscriber to connect to the mobile network. A dotted line with arrow heads extends from the 3G network area to the 5G network area, passing through UE 202. This visual element represents the movement of UE 202 from the legacy 3G network to the more advanced 5G network, illustrating the scenario where a subscriber returns to their home network after roaming.

The distinction between 3G and 5G networks in this panel serves to highlight the technological transition that mobile networks have undergone. While 3G networks represented a significant advancement in mobile communications, offering improved data speeds and introducing mobile internet capabilities, 5G networks have taken this evolution several steps further. 5G technology offers significantly higher data rates, reduced latency, and increased network capacity, enabling a wide range of new applications and services. However, the principles illustrated in this figure are not limited to just 3G and 5G networks. The concept of managing subscriber information across different network generations may apply to various network technologies, including future developments beyond 5G. For instance, as networks continue to evolve, similar processes may be implemented for transitions between 5G and 6G networks, or between any future network generations. A common aspect in these scenarios is the management of subscriber data and network registrations as users move between networks with different capabilities and architectures.

The second panel (top-right) of FIG. 2 focuses on the interaction between UE 202 and the Access and Mobility Management Function (AMF) 208. AMF 208 is represented as a computer server rack with multiple horizontal lines indicating individual servers, and small lights and buttons visible. This visual representation underscores the complex infrastructure required to manage modern mobile networks. In this panel, UE 202 is shown sending a registration request to AMF 208. This is visualized by a large, stylized envelope emerging from UE 202's screen, labeled "Registration Request." A dashed arrow connects this envelope to AMF 208, representing the transmission of the request. This registration request is one step in the process of a UE 202 connecting to a new network or updating its location within the network.

The Access and Mobility Management Function (AMF) plays a helpful role in 5G networks. It is responsible for various tasks related to access control and mobility management. These responsibilities include authentication and authorization of UEs attempting to connect to the network, managing UE mobility, including tracking UE locations and handling handovers between different base stations, managing UE registration states and establishing the control plane signaling connection between the UE and the network, and/or interfacing with other network functions to facilitate various network procedures. In the context of this figure, AMF 208 serves as the entry point for UE 202 as it attempts to register with the 5G network after moving from the 3G network coverage area. The registration request sent by UE 202 initiates a series of processes within the network to update the location of UE 202 and ensure proper connectivity.

The third panel (bottom-left) of FIG. 2 illustrates the User Data Management (UDM) function 210 accessing the network interworking support database 212. UDM 210 is depicted as a server rack similar to AMF 208, emphasizing its role as a helpful network function. The network interworking support database 212 is represented by a cylindrical shape, a common visual metaphor for databases in technical diagrams. Four distinct arrows point from network interworking support database 212 to UDM 210, each labeled with a different type of information: "SUPI (Subscriber Permanent Identifier)", "Mobility Info", "SGSN (Serving GPRS Support Node) Info", and/or "VLR (Visitor Location Register) Info". These arrows represent the retrieval of subscriber information by UDM 210 from network interworking support database 212. This step may be helpful in the process of managing a UE's transition between different network technologies.

The User Data Management (UDM) function is a helpful component in 5G networks, responsible for storing and managing subscriber data. It serves as a centralized repository for subscriber information, supporting various network functions that require access to this data. In the context of this figure, UDM 210 plays a role in managing the transition of UE 202 from the 3G network to the 5G network by retrieving and updating the necessary subscriber information. The network interworking support database 212 is a helpful element in enabling interoperability between different network generations.

The fourth panel (bottom-right) of FIG. 2 depicts the deregistration process, which is a one step in clearing outdated VLR information. On the left side of this panel, UDM 210 is shown again. To its right is another server rack labeled "HLR 214 (Home Location Register)". An arrow connects UDM 210 to HLR 214, labeled "Deregistration Request". This arrow represents the initiation of the deregistration process by UDM 210. From HLR 214, two arrows extend: one points to a trash can icon, labeled "Clear VLR Info", and another points to a cloud-like shape representing the legacy network, labeled "Cancellation Message". Inside the cloud shape, a small box labeled "VLR 216 (Visitor Location Register)" is shown. These visual elements represent the actions taken by HLR 214 in response to the deregistration request.

The Home Location Register (HLR) is a helpful component in mobile networks, traditionally associated with 2G and 3G systems. In the context of interworking between 5G and legacy networks, HLR 214 serves as a bridge between the modem 5G core network functions and the legacy network elements. Its primary responsibilities may include storing permanent subscriber data, including the subscriber's identity, service profile, and/or current location, managing subscriber mobility by updating location information as subscribers move between different network areas, and/or supporting authentication and authorization processes for subscribers. In this panel, HLR 214 optionally performs either or both of two actions in response to the deregistration request from UDM 210: clearing VLR Information and sending a Cancellation Message. The clearing of VLR Information, represented by the arrow pointing to the trash can icon, involves removing or updating the subscriber's VLR information in the network interworking support database. This step may help prevent outdated information from causing issues with call routing or other network services. The Cancellation Message, represented by the arrow pointing to the legacy network cloud, informs the VLR 216 in the legacy network that the subscriber is no longer registered in its area. This action helps maintain consistency across different network elements and ensures that the legacy network does not attempt to route calls or services to a subscriber who has moved to the 5G network.

In various examples, the registration request of method 100 may include an IMS (IP Multimedia Subsystem) registration request. Moreover, in further examples, method 100 may further include performing an IMS registration for the UE after clearing the VLR information. By way of background, the IP Multimedia Subsystem (IMS) is an architectural framework for delivering IP multimedia services in mobile and fixed networks. Initially conceived for mobile networks, IMS has evolved to become a component in the convergence of fixed and mobile telecommunications networks. It provides a standardized technique for offering voice, video, messaging, and other multimedia services over IP-based networks, enabling operators to leverage a common core infrastructure across different access technologies.

IMS utilizes the Session Initiation Protocol (SIP) for signaling and session management. This protocol-centric technique allows for flexible service creation and deployment, enabling operators to introduce new multimedia services rapidly and cost-effectively. The IMS architecture is composed of several functional elements, including the Call Session Control Functions (CSCFs), which are SIP servers responsible for processing SIP signaling packets in the IMS. These are divided into three types: Proxy-CSCF (P-CSCF), which is the first point of contact for the UE in the IMS network; Interrogating-CSCF (I-CSCF), which queries the Home Subscriber Server (HSS) to determine the appropriate Serving-CSCF; and the Serving-CSCF (S-CSCF), which performs session control services for the UE and maintains session state.

In the context of network interworking and mobility management, IMS contributes to ensuring seamless service continuity as users move between different access technologies or network generations. For instance, when a user transitions from a legacy circuit-switched network to a packet-switched LTE or 5G network, IMS facilitates the handover of voice calls and other multimedia sessions. This is achieved through capabilities such as Voice over LTE (VoLTE) and Voice over New Radio (VoNR), which leverage IMS to provide high-quality voice services over packet-switched networks.

The IP Multimedia Subsystem (IMS) registration process is a procedure that enables a User Equipment (UE) to gain access to IMS services. During IMS registration, the UE establishes a relationship with the IMS network, authenticates itself, and provides its current location. This process typically involves several steps, including the discovery of the P-CSCF, sending a SIP REGISTER request, authentication challenges, and finally, the successful registration with the S-CSCF. In scenarios involving network interworking, such as when a UE returns to its home 5G network after roaming on a legacy network, the IMS registration process may need to be performed anew to ensure that the UE may access multimedia services through the appropriate network elements.

IMS also supports interworking between different types of networks. For example, it enables interoperability between IP-based networks and traditional circuit-switched networks through components like the Media Gateway Control Function (MGCF) and the Media Gateway (MGW). This interworking capability contributes to maintaining service continuity and enabling communication between subscribers on different types of networks, such as enabling a VoLTE call from a 4G/5G network to connect with a user on a legacy 2G/3G network.

Furthermore, IMS contributes to enabling advanced services such as Rich Communication Services (RCS), which provide enhanced messaging and communication capabilities beyond traditional voice and SMS. As networks continue to evolve towards 5G and beyond, IMS remains a component in the delivery of multimedia services, supporting new use cases and service scenarios while maintaining backwards compatibility with legacy systems.

Regarding the SGSN (see FIG. 2, bottom left panel), the Serving GPRS Support Node is a component in mobile networks that may play a role in packet-switched data services, particularly in 2G and 3G networks. It was introduced as part of the General Packet Radio Service (GPRS) architecture and continued to evolve with the development of 3G UMTS (Universal Mobile Telecommunications System) networks. The SGSN may serve as a focal point for packet-based communications within the network, handling a variety of functions related to mobility management, session management, and data transfer.

In its capacity as a mobility management entity, the SGSN may be responsible for tracking the location of mobile devices within its service area. This may involve maintaining up-to-date information about which cell or group of cells a device is currently associated with, enabling the network to efficiently route incoming data to the correct location. The SGSN may also manage the process of updating this location information as devices move between different areas of the network, ensuring continuous connectivity for mobile users.

From a session management perspective, the SGSN may be involved in establishing, maintaining, and terminating packet data protocol (PDP) contexts. These contexts may represent the data sessions that enable mobile devices to communicate over the packet-switched network. When a device requests a data connection, the SGSN may work in conjunction with other network elements to set up the necessary resources and routing paths to enable this communication.

The SGSN may also play a role in authentication and security. It may interact with the Home Location Register (HLR) to authenticate subscribers before enabling them access to network services. This process helps to ensure that only authorized users may utilize the network's resources and protects against fraudulent access attempts.

In the context of data transfer, the SGSN may act as a router for user data traffic. It receives data packets destined for mobile devices and forwards them to the appropriate Base Station Controller (BSC) in 2G networks or Radio Network Controller (RNC) in 3G networks. It also receives data from mobile devices and routes it towards its intended destination, whether that's within the mobile network or out to external packet data networks like the internet.

As networks have evolved towards 4G LTE and 5G architectures, the functions of the SGSN have been partially absorbed or replaced by other network elements. For instance, in 4G networks, the Mobility Management Entity (MME) takes over many of the mobility management functions previously handled by the SGSN, while the Serving Gateway (S-GW) assumes responsibility for user plane data routing. However, SGSNs remain relevant in many networks, particularly in scenarios involving interworking between different network generations.

In the context of network interworking, the SGSN may play a role in managing the transition of subscribers between different network technologies. For example, when a subscriber moves from a 3G to a 4G or 5G network, there may be a need to transfer or update subscriber information that was previously managed by the SGSN. This may involve clearing or updating SGSN-related information in central databases to ensure that the subscriber's data sessions and mobility are properly managed in the new network environment.

The SGSN's address is a piece of information that identifies the specific SGSN serving a particular subscriber at a given time. This address is typically stored in the network's central databases and is used by other network elements to route signaling and user data appropriately. In scenarios involving network interworking or subscriber movement between different network generations, managing and updating this SGSN address information becomes helpful to ensure proper routing and avoid issues with outdated subscriber data.

Figure 3:
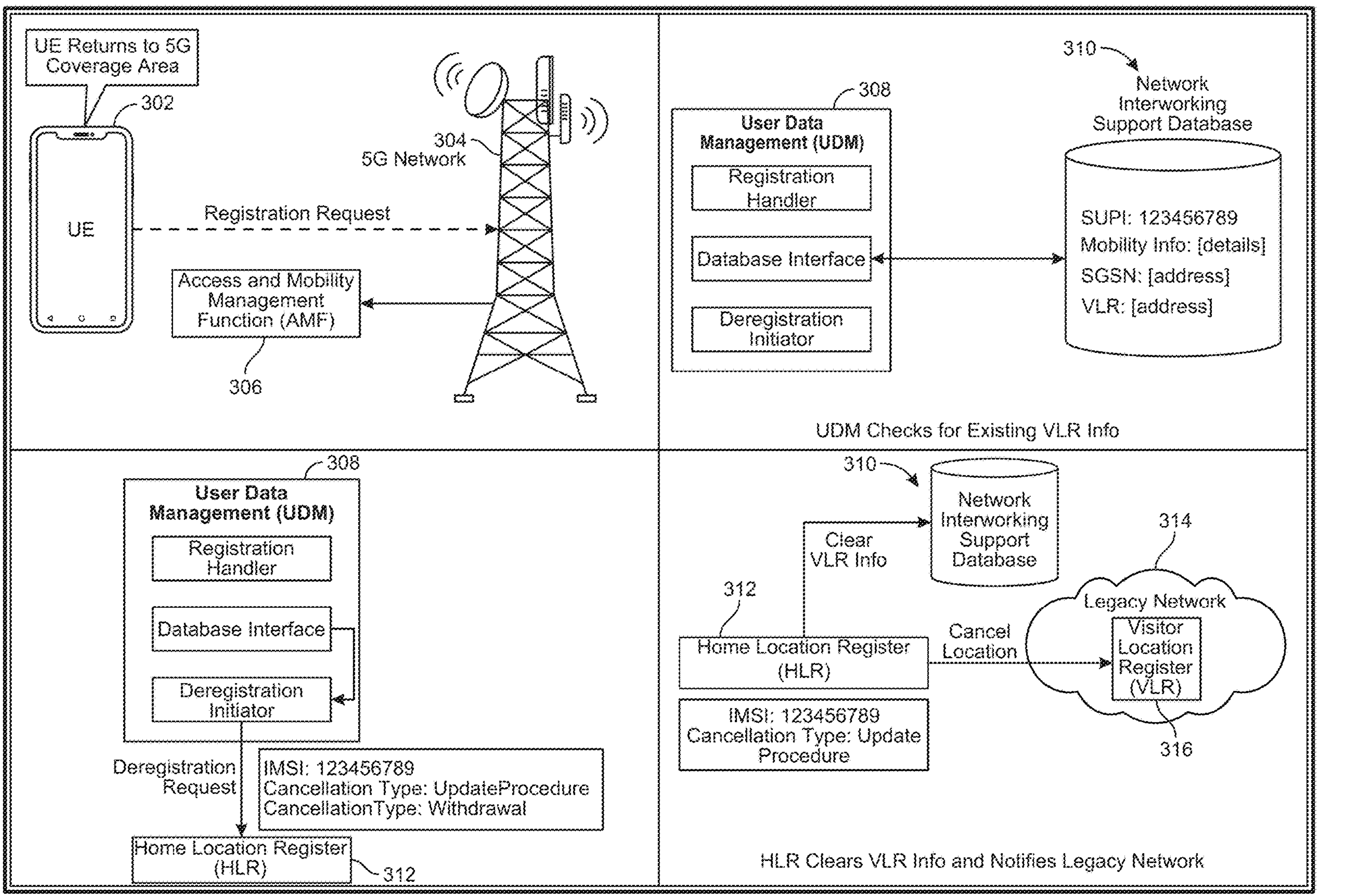
FIG. 3 presents an example detailed technical illustration of components and processes involved in a deregistration process for clearing outdated subscriber information.

FIG. 3 presents a detailed technical illustration of example components and processes involved in a deregistration process for clearing outdated subscriber information in a mobile network environment. This figure provides a comprehensive view of example interactions between various network elements during the process of updating subscriber data when a User Equipment (UE) transitions between different network technologies. The illustration is divided into four panels, each depicting a different stage of the process, collectively demonstrating the complex interplay between modern and legacy network components in managing subscriber mobility across diverse network generations.

The top-left panel of FIG. 3 depicts the initial stage of the deregistration process, showing UE 302 initiating a registration request. UE 302 is represented as a smartphone device, emphasizing its role as the end-user equipment in the mobile network ecosystem. In practice, UE 302 may encompass a wide range of devices capable of connecting to mobile networks, including but not limited to smartphones, tablets, laptops with cellular modems, Internet of Things (IoT) devices, or vehicle-based communication systems. The diversity of potential UE types underscores the need for flexible and robust subscriber management systems that may handle various device capabilities and usage patterns. To the right of UE 302, a simplified tower structure labeled "5G Network 304" is shown, representing the advanced network infrastructure to which UE 302 is attempting to connect. This 5G network symbolizes the latest generation of cellular network technology, characterized by high data rates, reduced latency, and increased network capacity.

A dashed arrow points from UE 302 to the 5G Network 304, labeled "Registration Request," illustrating the initiation of the registration process. This registration request typically contains information such as the identity of UE 302, its current location, and/or the type of services it requires. The registration request may be triggered by various events, such as UE 302 powering on, moving into a new tracking area, or transitioning from one network technology to another. Below this, a rectangular box represents the Access and Mobility Management Function (AMF) 306. The AMF 306 may play a role in 5G network 304, handling tasks such as UE authentication, authorization, and/or mobility management. A solid arrow connects 5G Network 304 to AMF 306, indicating the flow of the registration request through the network infrastructure. This connection represents the complex signaling procedures that occur between the radio access network and the core network elements.

The top-right panel focuses on the User Data Management (UDM) function and its interaction with the network interworking support database. UDM 308 is depicted as a large rectangular box, emphasizing its role in managing subscriber data. The UDM 308 serves as a centralized repository for subscriber information in 5G networks, evolving from and expanding upon the functions of the Home Subscriber Server (HSS) in earlier network generations. Within UDM 308, three smaller compartments are shown: "Registration Handler," "Database Interface," and "Deregistration Initiator." These compartments represent the different aspects of the UDM in processing registration requests and managing subscriber data. The modular representation of these functions within the UDM 308 highlights the flexibility and scalability of modern network architectures, where network functions may be implemented as virtualized software components running on standard hardware platforms. This technique, known as Network Function Virtualization (NFV), enables more efficient resource utilization and easier scaling of network capabilities compared to traditional hardware-based implementations.

To the right of UDM 308, a cylindrical shape labeled "Network Interworking Support Database 310" is drawn, representing the database that stores subscriber information. This database may be implemented using various technologies, such as relational database management systems (RDBMS), NoSQL databases, or distributed data stores, depending on the specific requirements or preferences of the network operator. The choice of database technology may impact factors such as query performance, data consistency, and scalability of the subscriber management system. Bidirectional arrows connect the "Database Interface" compartment of UDM 308 to the Network Interworking Support Database 310, illustrating the exchange of data between these components. This interaction may involve complex database operations, including read and write transactions, data synchronization mechanisms, and potentially, data replication for redundancy and fault tolerance.

The bottom-left panel illustrates the generation of the deregistration request. Within the UDM 308 box from the previous panel, an arrow is drawn from the "Database Interface" compartment to the "Deregistration Initiator" compartment. This arrow represents the internal process within UDM 308 where the retrieved subscriber information triggers the generation of a deregistration request. The decision to initiate a deregistration process may be based on various factors, such as detecting outdated Visitor Location Register (VLR) information, identifying conflicts in subscriber data across different network elements, or responding to specific network events or operator-defined policies. From the "Deregistration Initiator" compartment, another arrow points outside the UDM 308 box towards a new box labeled "HLR 312 (Home Location Register)." This arrow is labeled "Deregistration Request," showing the transmission of the request from UDM 308 to HLR 312.

The Home Location Register (HLR) is a component in legacy mobile networks, traditionally associated with 2G and 3G systems. In the context of interworking between 5G and legacy networks, HLR 312 serves as a bridge between the modem 5G core network functions and the legacy network elements. Its inclusion in this diagram highlights the ongoing desire for backward compatibility and seamless interoperability between different network generations. Near the deregistration request arrow, a text box details the contents of the request, including "IMSI: 123456789," "Cancellation Type: UpdateProcedure," and "Cancellation-Type: Withdrawal." The International Mobile Subscriber Identity (IMSI) is a unique identifier assigned to each mobile subscriber, typically stored in the subscriber's SIM card. The cancellation type information guides the HLR and other network elements in determining how to process the deregistration request and update subscriber records accordingly.

The bottom-right panel depicts the VLR information clearing process. The HLR 312 box from the previous panel is shown on the left side. On the right, a cloud shape labeled "Legacy Network 314" is drawn, representing the older network infrastructure. This visual representation emphasizes the distinction between the modern 5G core network and the legacy network elements. Inside the Legacy Network 314 cloud, a smaller box labeled "VLR 316 (Visitor Location Register)" is placed, indicating the location of the VLR within the legacy network. The VLR is responsible for storing temporary subscriber information for users roaming in its associated network area. An arrow is drawn from HLR 312 to VLR 316, labeled "Cancel Location." This cancellation message may be one step in the process of clearing outdated subscriber information, ensuring that the legacy network elements do not retain stale data that may lead to incorrect call routing or service delivery.

Near the Cancel Location arrow, a text box provides details of the cancellation message, including "IMSI: 123456789" and "Cancellation Type: UpdateProcedure." These parameters enable the VLR to identify the specific subscriber record to be updated or removed. From HLR 312, another arrow points back to the Network Interworking Support Database 310, labeled "Clear VLR Info." This arrow illustrates the process of updating the database to remove outdated VLR information, ensuring consistency across all network elements involved in subscriber management. The clearing of VLR information may be one step in maintaining accurate subscriber location data, which is essential for efficient call routing and service delivery in mobile networks.

Figure 4:
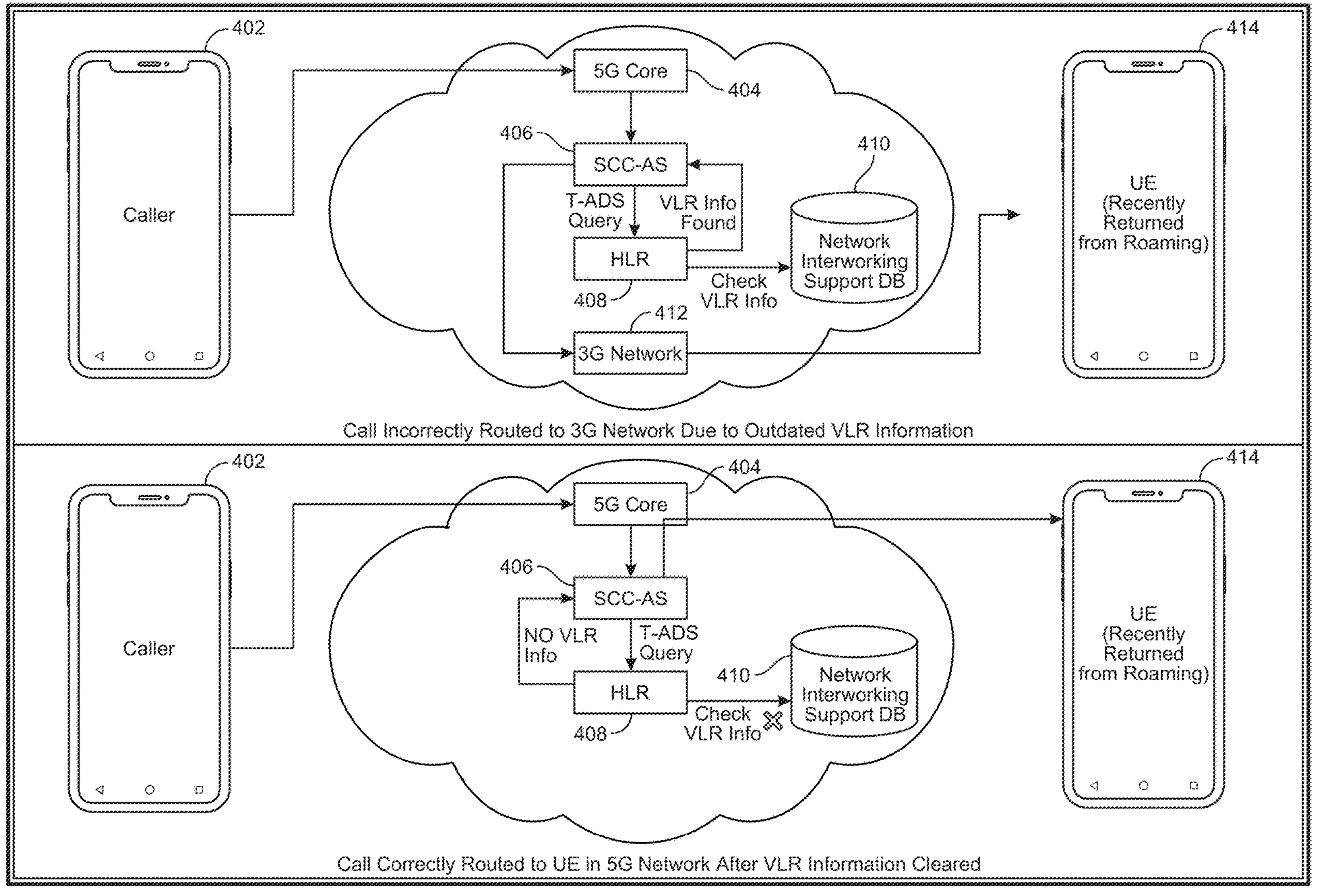
FIG. 4 provides an example comparative illustration demonstrating call routing before and after VLR information clearing in a multi-generation network scenario.

FIG. 4 provides a comparative illustration demonstrating examples of call routing scenarios before and after Visitor Location Register (VLR) information clearing in a multi-generation network environment. This figure is divided into two main panels, each representing a distinct state of the network, highlighting the potential impact of outdated subscriber information on call routing efficiency and the improvements that may be achieved through proper management of subscriber data across different network generations. The visual representation effectively conveys the complex interplay between modern and legacy network elements in handling call routing, especially in scenarios where subscribers move between different network technologies.

The top panel of FIG. 4 depicts the scenario before VLR information clearing. On the left side of this panel, a smartphone labeled "Caller 402" is shown, representing the device initiating a call. This caller may be located within the home network or in a different network altogether, as the principles illustrated apply to both local and long-distance calling scenarios. In the center of the panel, a large cloud shape represents the network infrastructure, encompassing both modern and legacy network elements. This visual metaphor conveys the complex and interconnected nature of modern telecommunications networks, where multiple generations of technology often coexist and may interoperate seamlessly. Within the network cloud, several components are illustrated, including a box labeled "5G Core 404" near the top, representing the core network of the latest generation mobile technology. 5G Core 404 employs a service-based architecture, which may offer increased flexibility, scalability, and efficiency compared to earlier network generations. Below the 5G Core 404, a box labeled "SCC-AS 406" (Service Centralization and Continuity Application Server) is shown, connected to the 5G Core 404 with a line. SCC-AS may play a role in managing calls across different access networks and ensuring service continuity as subscribers move between different network technologies.

Adjacent to the SCC-AS 406, a box labeled "HLR 408" (Home Location Register) is depicted, also connected to the 5G Core 404. The inclusion of the HLR 408 in this diagram underscores the helpfulness of interworking between modern 5G networks and legacy systems. The HLR 408, traditionally associated with 2G and 3G networks, continues to play a role in subscriber data management and call routing in multi-generation network environments. Connected to the HLR 408 is a cylinder labeled "Network Interworking Support Database 410", representing the database that stores subscriber information for managing interoperability between different network generations. At the bottom of the network cloud, a box labeled "3G Network 412" represents the legacy network infrastructure. The inclusion of this element highlights the challenge of maintaining seamless services across different generations of network technology, a common scenario as operators gradually upgrade their infrastructure. On the right side of the cloud, another smartphone labeled "UE 414 (recently returned from roaming)" is shown, representing the intended recipient of the call. The label indicates that UE 414 has recently moved from a roaming scenario back to its home network, setting the stage for potential issues with outdated subscriber location information.

The call flow in this "before" scenario in the top panel is illustrated with a series of arrows, depicting the path of the call attempt. The process begins with an arrow extending from Caller 402 to the 5G Core 404, representing the initial call attempt entering the network. From the 5G Core 404, an arrow points to SCC-AS 406, showing the involvement of this application server in call processing. SCC-AS 406 then sends a query to the HLR 408, labeled "T-ADS query" (Terminating Access Domain Selection). This step represents the network's attempt to determine the best way to route the call to the intended recipient. An arrow from the HLR 408 to the Network Interworking Support Database 410, labeled "Check VLR info", illustrates the process of retrieving the subscriber's location information. The HLR 408 then sends information back to the SCC-AS 406, labeled "VLR info found", indicating that the database contains VLR information for the subscriber. Based on this outdated information, the SCC-AS 406 routes the call to the 3G Network 412, as represented by the next arrow. Finally, an arrow extends from the 3G Network 412 towards UE 414, but notably does not reach it. This visual cue represents the failed attempt to connect the call through the legacy network. A note at the bottom of this panel states: "Call incorrectly routed to 3G network due to outdated VLR information". This scenario illustrates how stale subscriber data may lead to inefficient call routing, potentially resulting in failed connections or increased call setup times.

The bottom panel of FIG. 4 illustrates the same network topology but represents the scenario after VLR information clearing has taken place. The difference in this panel is visible in the Network Interworking Support Database 410, where a small "X" or deletion symbol is shown next to "Check VLR info", indicating that the outdated VLR information has been cleared. The call flow in this "after" scenario is represented by a new set of arrows, demonstrating a more efficient routing process. As before, the first arrow extends from Caller 402 to the 5G Core 404. The 5G Core 404 again routes the call to the SCC-AS 406. The SCC-AS 406 sends a T-ADS query to the HLR 408, which then checks the Network Interworking Support Database 410 for VLR information. This time, the HLR 408 informs the SCC-AS 406 that no VLR information is found, as indicated by the label "No VLR info". Based on this updated information, the SCC-AS 406 routes the call directly to UE 414 through the 5G Core 404, bypassing the legacy 3G Network entirely. A note at the bottom of this panel states: "Call correctly routed to UE in 5G network after VLR information cleared". This scenario demonstrates how proper management of subscriber information across network generations may lead to more efficient call routing.

The comparison between these two panels effectively illustrates the importance of maintaining accurate and up-to-date subscriber information in multi-generation network environments. By clearing outdated VLR information when a subscriber returns to their home network, operators may potentially improve call routing efficiency, reduce the load on legacy network elements, and enhance the overall user experience. This process may be particularly beneficial in networks where subscribers frequently move between areas covered by different generations of network technology. The mechanisms depicted in FIG. 4 may be adapted and extended to support various network configurations and future technologies. For instance, similar principles may apply to interworking between 5G and future 6G networks, or in scenarios involving non-terrestrial network components. As networks continue to evolve, the challenge of managing subscriber information across different technologies and ensuring efficient service delivery is likely to remain a consideration for network operators and equipment vendors alike. The ability to quickly and accurately update subscriber location and registration information across diverse network elements may contribute significantly to the overall performance and reliability of complex, multi-generation mobile networks.

In some examples, the deregistration request, transmitted by the UDM (User Data Management) function, may prevent a Service Centralization and Continuity Application Server (SCC-AS) from performing a Terminating Access Domain Selection (T-ADS) query based on the cleared VLR information. This action helps to avoid potential issues with call routing and service delivery as a subscriber transitions between network generations. The SCC-AS may play a role in managing call continuity and ensuring seamless service as users move between different access technologies, potentially enabling calls to be seamlessly transitioned from a circuit-switched domain to a packet-switched domain or vice versa. The SCC-AS may use various mechanisms for managing calls, such as coordinating with network elements like the Home Location Register (HLR) to determine the best routing paths for calls.

The Terminating Access Domain Selection (T-ADS) query may be one step in the process used by the SCC-AS to determine the most appropriate access network or network element to route a call to. It may rely on various data sources, potentially including the Visitor Location Register (VLR), to identify the subscriber's current network association. By proactively clearing outdated VLR information, the deregistration process may prevent the SCC-AS from using outdated data in its routing decisions, potentially reducing the risk of calls being misrouted to the incorrect network or experiencing delays due to inaccurate location information.

Similarly, in some examples, clearing the VLR information may prevent generation of a Provide Roaming Number (PRN) response for the UE (User Equipment). This action contributes to ensuring that calls are routed correctly and efficiently as a subscriber transitions between different network generations. The PRN response, often employed in legacy network scenarios, might contain information about the subscriber's current location or routing instructions for calls intended for a subscriber roaming in a visited network. By clearing the VLR information, the network may help ensure that the outdated PRN response is not used, potentially avoiding unnecessary signaling and redirecting calls to the correct network based on the most up-to-date subscriber location information. The avoidance of an outdated PRN response may lead to a smoother handover experience for the subscriber, reducing the possibility of call failures or delays due to inaccurate routing information.

Figure 5:
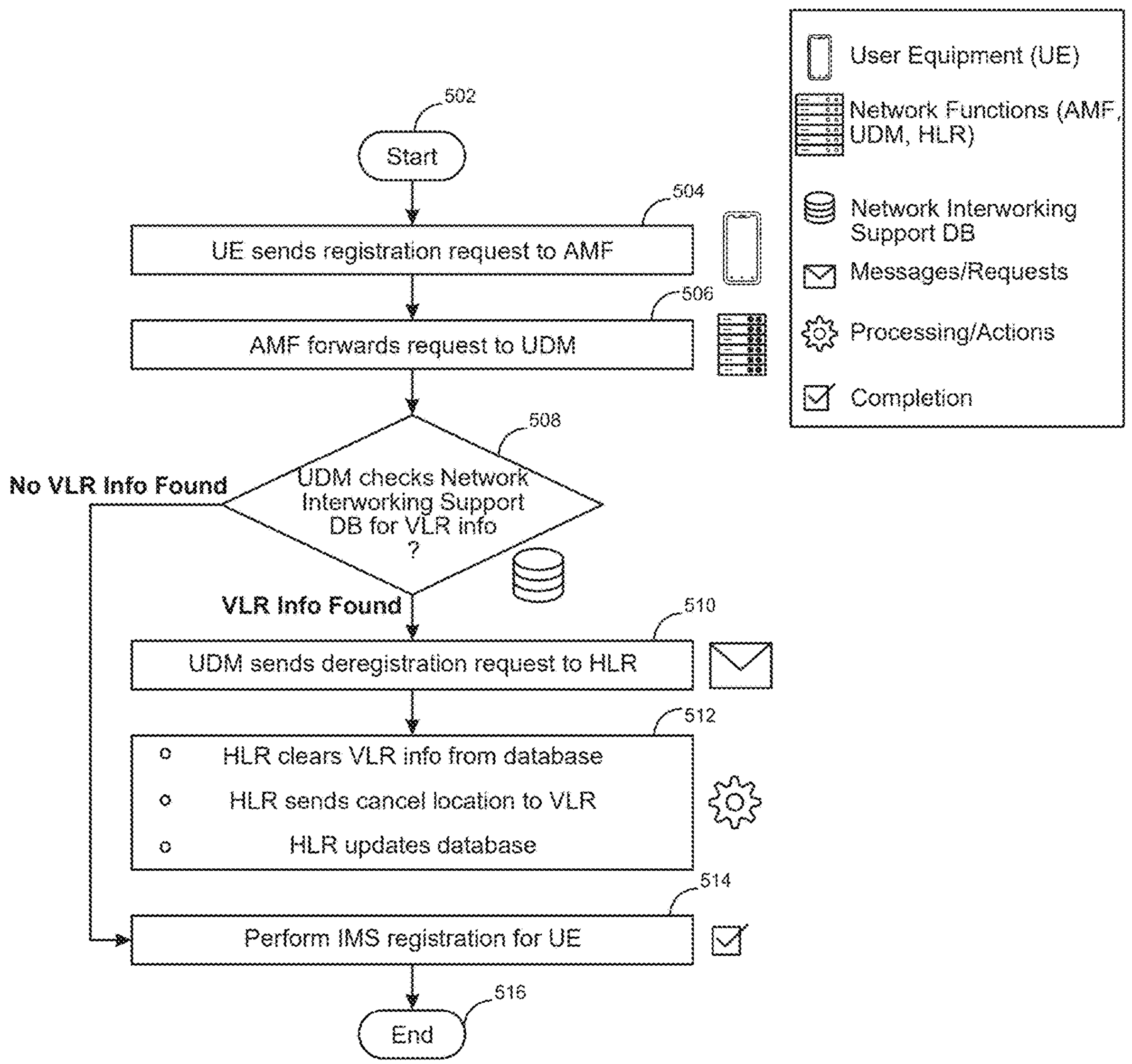
FIG. 5 displays an example technical flowchart illustrating a step-by-step process of VLR information clearing and subscriber data management across different network generations.

FIG. 5 displays a technical flowchart illustrating an example step-by-step process of Visitor Location Register (VLR) information clearing and subscriber data management across different network generations. This diagram provides a visual representation of the decision-making process and actions taken by various network components when a User Equipment (UE) attempts to register on a modern network after returning from a legacy roaming scenario. The flowchart format conveys the sequential nature of the process, highlighting the interplay between different network functions and databases in managing subscriber information. At the start step 502, a rounded rectangle labeled "Start" marks the beginning of the process. This starting point represents the moment when a UE initiates a registration request upon entering the coverage area of its home network. Following the start step 502, the first operational step 504 in the flowchart is represented by a rectangle labeled "UE sends registration request to AMF". This step depicts the initial action taken by the UE to establish a connection with the network. The UE, which may be any device capable of connecting to a mobile network such as a smartphone, tablet, or IoT device, initiates the process by sending a registration request. In this example, this request is directed to the Access and Mobility Management Function (AMF), a component of the 5G core network responsible for handling access control and mobility management. The registration request typically contains information about the UE's identity, its current location, and/or the type of services it requires. This step is helpful to the network's ability to track the UE's location and manage its connectivity, ensuring that calls and data services may be properly routed to the device.

The flowchart then progresses to step 506, represented by a rectangle labeled "AMF forwards request to UDM". This step illustrates the interaction between different network functions within the 5G core. The AMF, upon receiving the registration request from the UE, forwards this information to the User Data Management (UDM) function. The UDM serves as a centralized repository for subscriber data in 5G networks, evolving from and expanding upon the functions of the Home Subscriber Server (HSS) in earlier network generations. This forwarding of the request enables the network to begin the process of verifying the UE's subscription information and determining its current status within the network. The interaction between the AMF and UDM represents one aspect of the service-based architecture employed in 5G networks, where different network functions communicate through standardized interfaces to perform complex operations. This architectural technique enhances the flexibility and scalability of the network, enabling more efficient management of subscriber data and network resources. The UDM, in particular, plays a role in this process by maintaining a comprehensive view of subscriber information across different access technologies and network generations. Its ability to interface with both modern 5G elements and legacy network components makes it a helpful part of the interworking mechanism between different generation networks.

The next element in the flowchart is a decision step 508, represented by a diamond shape labeled "UDM checks Network Interworking Support D for VLR info". At this stage, the UDM queries the Network Interworking Support Database to determine if there is any existing Visitor Location Register (VLR) information associated with the UE. This check is a critical step in the process of managing subscriber data across different network generations. The presence of VLR information in the database would indicate that the UE was previously registered on a legacy network, such as a 3G network, potentially while roaming. The outcome of this database check determines the subsequent actions in the flowchart. From decision step 508, two paths emerge, representing the different scenarios based on whether VLR information is found in the database. One path is labeled "No VLR info found", leading directly to a step for performing IP Multimedia Subsystem (IMS) registration. The other path, labeled "VLR info found", leads to additional steps for clearing the outdated VLR information. This branching structure in the flowchart effectively illustrates how the network adapts its behavior based on the subscriber's recent network usage history. The Network Interworking Support Database may play a role in enabling seamless operation across different network generations. It serves as a bridge between modern 5G systems and legacy networks, storing information that is helpful for managing subscriber mobility and ensuring consistent service delivery.

If VLR information is found, the flowchart proceeds to step 510, a rectangle labeled "UDM sends deregistration request to HLR". This step represents the initiation of the process to clear outdated subscriber information from legacy network elements. The UDM (User Data Management), having determined that the UE has VLR information associated with a previous network registration, takes action to update this information. It sends a deregistration request to the Home Location Register (HLR), a component in legacy mobile networks that continues to play a role in managing subscriber data in multi-generation network environments. Following the deregistration request, the flowchart shows step 512, a rectangle with three sub-sections, all associated with actions performed by the HLR. These sub-sections are labeled "HLR clears VLR info from database", "HLR sends Cancel Location to VLR", and/or "HLR updates database". Step 512 illustrates the multiple actions taken by the HLR in response to the deregistration request. First, it clears the outdated VLR information from the Network Interworking Support Database, ensuring that the central repository of subscriber data is updated. Then, it sends a Cancel Location message to the VLR in the legacy network, instructing it to remove the subscriber's registration information. Finally, it updates the database to reflect these changes. These actions collectively ensure that all relevant network elements have consistent and up-to-date information about the subscriber's location and registration status. The inclusion of the HLR in this process highlights the continuing relevance of legacy network components in modem mobile networks. While 5G networks introduce new elements such as the UDM (User Data Management), the need or desire to support subscribers across multiple network generations indicates the ongoing use and integration of legacy systems.

The flowchart then converges to a common step 514 for both paths, represented by a rectangle labeled "Perform IMS registration for UE". Step 514 indicates that regardless of whether VLR information needed to be cleared, the network proceeds with registering the UE for IP Multimedia Subsystem (IMS) services. IMS registration is a critical process in modern mobile networks, enabling the delivery of multimedia services and Voice over LTE (VoLTE) or Voice over New Radio (VoNR) in 5G networks. This common endpoint for both paths in the flowchart emphasizes that the ultimate goal of the process is to ensure the UE is properly registered and able to access all available services in the new network. The IMS registration process involves a series of signaling exchanges between the UE and various network elements, including the Proxy Call Session Control Function (P-CSCF), Interrogating Call Session Control Function (I-CSCF), and/or Serving Call Session Control Function (S-CSCF). These exchanges authenticate the user, establish a secure connection, and/or set up the necessary resources for multimedia service delivery. At the bottom of the flowchart, an end step 516 marked by a rounded rectangle labeled "End" concludes the process.

Figure 6:
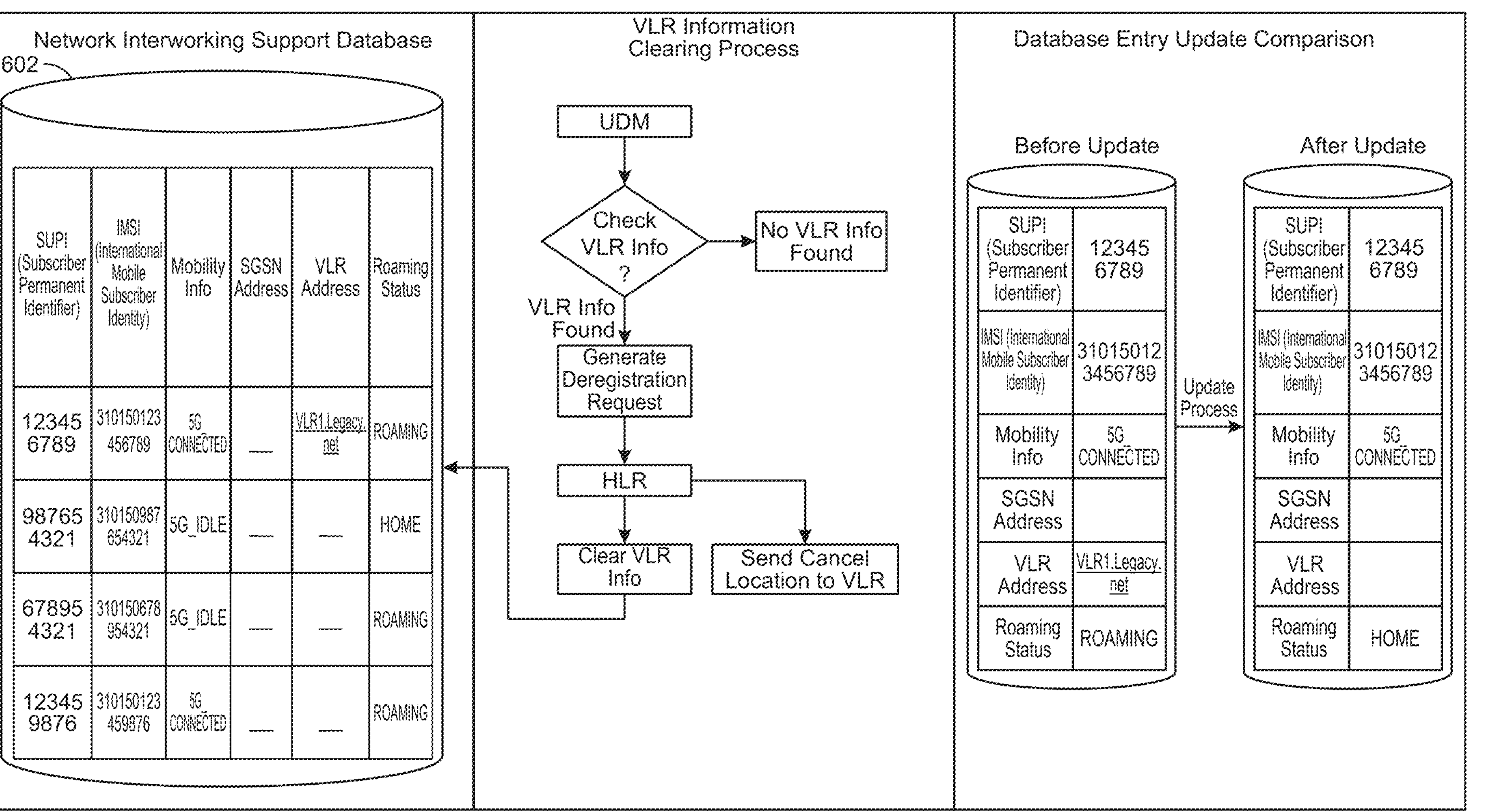
FIG. 6 presents an example multi-panel illustration focusing on the role of network databases in managing subscriber information during network transitions.

FIG. 6 presents an example multi-panel illustration focusing on the role of network databases in managing subscriber information during network transitions. This figure provides a representation of the network interworking support database structure and update process, demonstrating how subscriber data may be handled when a User Equipment (UE) moves between different network technologies.

The left section of FIG. 6 illustrates an example structure of the Network Interworking Support Database 602. Network Interworking Support Database 602 is depicted as a large cylinder, a common visual metaphor for databases in technical diagrams. Inside this cylinder, several rows of data are shown, each containing fields that may be relevant for managing subscriber information across different network generations. These fields include SUPI (Subscriber Permanent Identifier), IMSI (International Mobile Subscriber Identity), Mobility Info, SGSN Address, VLR Address, and Roaming Status. The illustration shows sample data for multiple entries, with at least one entry containing VLR information and others without it. The diagram displays an entry with SUPI: 123456789, IMSI: 310150123456789, Mobility Info: 5G_CONNECTED, SGSN Address: —, VLR Address: VLR1.legacy.net, and Roaming Status: ROAMING. Another entry shown in the diagram has SUPI: 987654321, IMSI: 310150987654321, Mobility Info: 5G_IDLE, SGSN Address: —VLR Address:—, and Roaming Status: HOME. This representation helps to visualize how the database might store and organize subscriber information, including details relevant to both modern and legacy network elements.

The center section of FIG. 6 depicts an example update process for clearing VLR information. This process is represented by a series of connected boxes, illustrating the flow of actions and decisions involved in updating subscriber data. The process begins with a box labeled "UDM", representing the User Data Management function. An arrow from the UDM points to a box labeled "Check VLR Info", indicating the initial step of querying the database for existing VLR information. From the "Check VLR Info" box, two arrows emerge, representing the possible outcomes of this check. One arrow, labeled "VLR Info Found", leads to a box labeled "Generate Deregistration Request". This path illustrates the actions taken when outdated VLR information is detected and needs to be cleared. The "Generate Deregistration Request" box is connected to another box labeled "HLR", representing the Home Location Register. From the HLR, two arrows extend, one pointing to a box labeled "Clear VLR Info" and another pointing to a box labeled "Send Cancel Location to VLR". These arrows represent the actions taken by the HLR in response to the deregistration request. The "Clear VLR Info" box has an arrow pointing back to the database cylinder in the left section, visualizing the process of updating the database to remove the outdated VLR information.

The right section of FIG. 6 provides a before-and-after comparison of a database entry update. This section shows two smaller database cylinders side by side. The left cylinder, labeled "Before Update", displays a sample entry with VLR information present. The right cylinder, labeled "After Update", shows the same entry with the VLR Address field cleared and the Roaming Status changed to HOME. An arrow labeled "Update Process" connects these two cylinders, representing the transition from the pre-update state to the post-update state. This visual comparison effectively illustrates the changes made to subscriber data during the VLR information clearing process.

Figure 7:
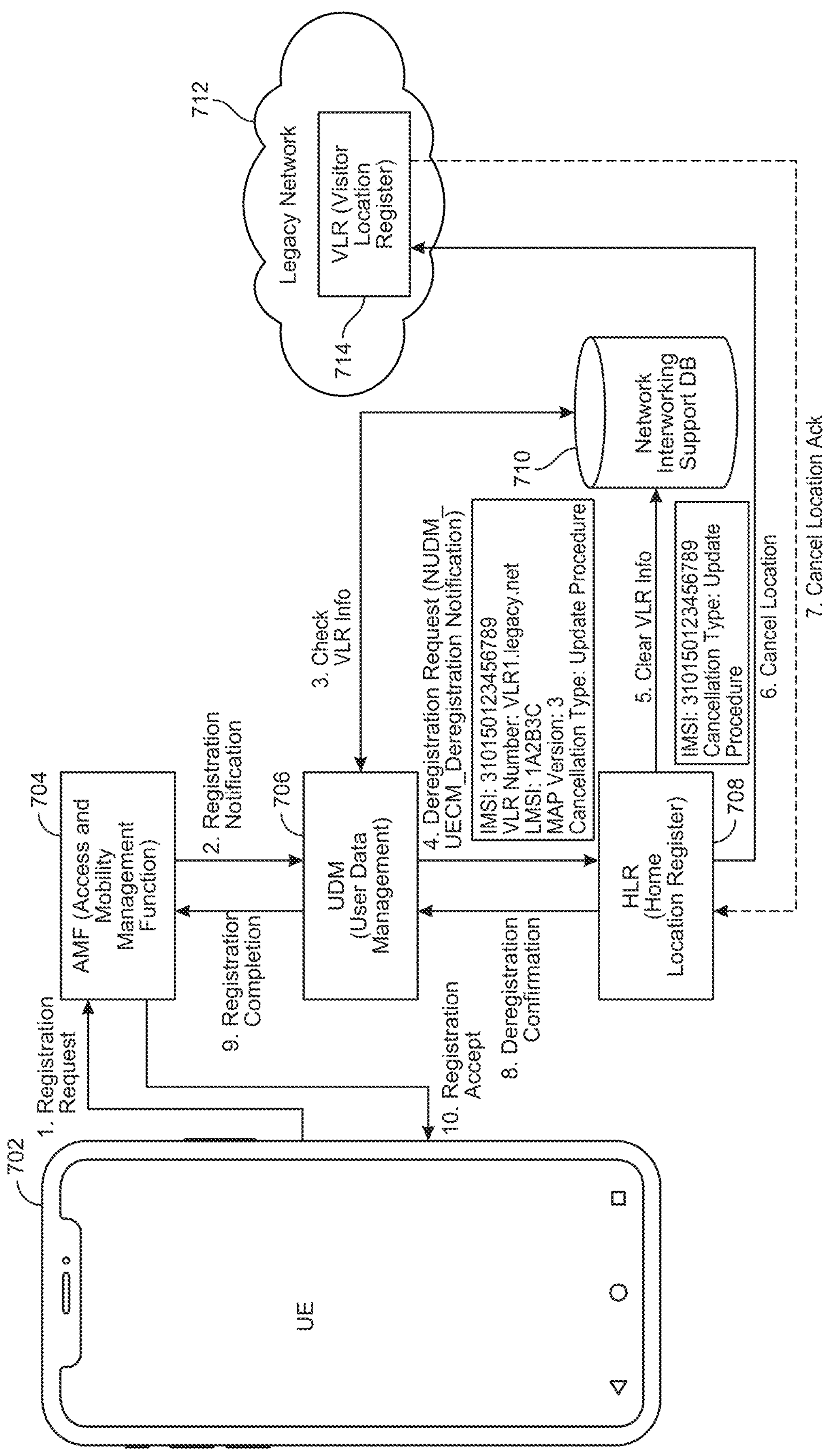
FIG. 7 shows an example detailed technical illustration of a deregistration request and cancellation message flow in a mobile network with legacy interworking capabilities.

FIG. 7 shows an example detailed technical illustration of a deregistration request and cancellation message flow in a mobile network with legacy interworking capabilities. This figure provides a visual representation of the sequence of interactions between various network elements during a process of clearing outdated Visitor Location Register (VLR) information when a User Equipment (UE) returns to its home network after roaming. The left side of the diagram in FIG. 7 shows a smartphone icon labeled "UE 702", representing the User Equipment initiating the process. To the right of UE 702, the diagram displays three boxes vertically aligned, labeled from top to bottom: "AMF 704" (Access and Mobility Management Function), "UDM 706" (User Data Management), and "HLR 708" (Home Location Register). These boxes represent components of the 5G core network and the legacy network elements involved in the example deregistration process. Further to the right, a cylinder labeled "Network Interworking Support Database 710" is depicted, representing the database that stores subscriber information for interworking purposes. On the far right of the diagram, a cloud shape labeled "Legacy Network 712" is shown, containing a box labeled "VLR 714" (Visitor Location Register), illustrating the legacy network components involved in the process.

The diagram illustrates the message flow with numbered arrows and labels, representing the sequence of actions in the deregistration and cancellation process. The first arrow, labeled "1. Registration Request", extends from UE 702 to AMF 704, indicating the initial step where the UE 702 sends a registration request to the AMF 704 upon returning to the home network coverage area. This action triggers the subsequent steps in the process. The second arrow, labeled "2. Registration Notification", connects AMF 704 to UDM 706. This arrow represents the AMF 704 forwarding the registration information to the UDM 706, which is responsible for managing subscriber data in the 5G core network. This step enables the UDM 706 to begin the process of verifying and updating the subscriber's information. The third step is represented by a bidirectional arrow between UDM 706 and Network Interworking Support Database 710, labeled "3. Check VLR Info". This arrow illustrates the UDM 706 querying the Network Interworking Support Database 710 to determine if there is any existing VLR information associated with the UE 202 from its previous registration on a legacy network.

The fourth arrow, extending from UDM 706 to HLR 708, is labeled "4. Deregistration Request (NUDM_UECM_DeregistrationNotification)". This arrow represents the UDM 706 initiating the deregistration process by sending a request to the HLR 708. Next to this arrow, the diagram shows a text box detailing the contents of the deregistration request, including IMSI: 310150123456789, VLR Number: VLR1.legacy.net, LMSI: 1A2B3C, MAP Version: 3, and/or Cancellation Type: UpdateProcedure. These details provide information about the subscriber and the nature of the deregistration request, enabling the HLR 708 to process the request accurately. The fifth step is depicted by an arrow from HLR 708 to Network Interworking Support Database 710, labeled "5. Clear VLR Info". This arrow illustrates the HLR 708 updating the database to remove the outdated VLR information associated with the UE 702. The sixth arrow extends from HLR 708 to VLR 714 within the Legacy Network 712 cloud. This arrow is labeled "6. Cancel Location" and represents the HLR 708 sending a cancellation message to the VLR 714 in the legacy network to remove the registration information in UE' 202. Adjacent to this arrow, a text box shows the contents of the cancellation message, including IMSI: 310150123456789 and cancellation Type: UpdateProcedure. These details may help ensure that the legacy network may accurately identify the subscriber record to be cancelled.

By way of background, the Local Mobile Subscriber Identity (LMSI) may refer to a unique identifier assigned to a subscriber within a specific network area. In mobile networks, the LMSI is used for location-based services, particularly in roaming scenarios. When a subscriber is roaming in a different network area, the visited network may assign a temporary LMSI to the subscriber, enabling for efficient management of the subscriber's location and communication within that network. While the subscriber's primary International Mobile Subscriber Identity (IMSI) remains constant, the LMSI may change as the subscriber moves between different network areas. The LMSI may be used for various purposes, including call routing, service delivery, and subscriber authentication within the visited network.

Similarly, the Mobile Application Part (MAP) protocol is a standard protocol used for exchanging information between mobile network elements. It may play a role in various network processes, including authentication, registration, and mobility management. The MAP protocol enables for the transmission of information between different network elements, such as the Home Location Register (HLR), the Visitor Location Register (VLR), and the Mobile Switching Center (MSC). It may be responsible for providing and updating subscriber information, managing subscriber location, and handling various signaling procedures necessary for seamless service delivery across the network.

The seventh step is represented by a dashed arrow from VLR 714 back to HLR 708, labeled "7. Cancel Location Ack". This arrow indicates the VLR's acknowledgment of the cancellation request, confirming that the subscriber's information has been removed from the legacy network. The eighth arrow, labeled "8. Deregistration Confirmation", extends from HLR 708 to UDM 706. This arrow represents the HLR informing the UDM that the deregistration process has been completed successfully. The final step in the process is depicted by the ninth arrow, labeled "9. Registration Completion", which connects UDM 706 back to AMF 704. This arrow illustrates the UDM 706 notifying the AMF 704 that the registration process, including the clearance of outdated VLR 714 information, has been completed. The tenth and final arrow in the diagram extends from AMF 704 to UE 702, labeled "10. Registration Accept". This arrow represents the AMF 704 sending a confirmation to the UE 202 that its registration on the home network has been accepted and completed. At the bottom of the diagram, a note states: "FIG. 7: Deregistration Request and Cancellation Message Flow in 5G to 3G Interworking".

In some examples, the VLR information remains in the network interworking support database based on a Mobile Switching Center (MSC) of the legacy network failing to send a purge request. The Mobile Switching Center (MSC) may be one component in legacy mobile networks, particularly in circuit-switched domains like 2G and 3G. It may serve as a central point of control for voice calls and SMS messages, facilitating the establishment and termination of connections between subscribers. The MSC may manage the switching of calls between different cells and networks, ensuring that communication is routed efficiently to the intended recipient. In situations where a subscriber roams on a visited network, the MSC in the visited network may be responsible for managing the subscriber's voice and data services while they are away from their home network. The MSC may be responsible for various tasks, including handling call setup and handover, managing subscriber location information, and routing signaling and data traffic.

Figure 8:
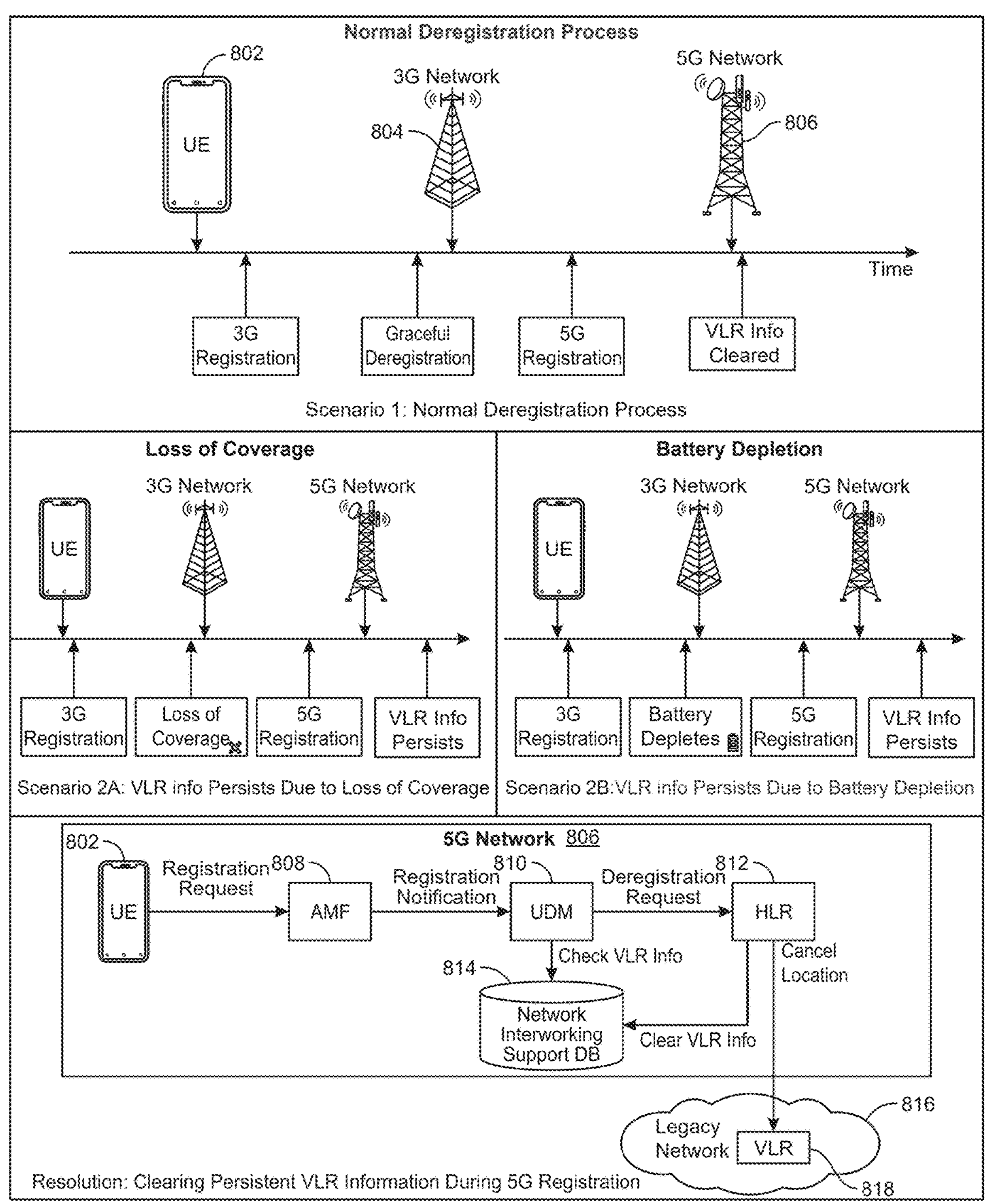
FIG. 8 illustrates an example multi-panel representation showcasing various scenarios of VLR information persistence and the corresponding resolution process.

FIG. 8 illustrates an example multi-panel representation showcasing various scenarios of Visitor Location Register (VLR) information persistence and the corresponding resolution process in a mobile network environment. This figure provides a visual comparison between normal deregistration scenarios and situations where VLR information may persist due to unexpected events, along with the subsequent resolution process.

The top section of FIG. 8 depicts a horizontal timeline representing the typical sequence of events when a User Equipment (UE) transitions smoothly between networks. Above the timeline, the diagram shows icons representing UE 802, a 3G Network 804 symbolized by a tower, and a 5G Network 806 represented by a more advanced tower structure. Below the timeline, a series of boxes illustrate the normal flow of events: "3G Registration", followed by "Graceful Deregistration", then "5G Registration", and finally "VLR Info Cleared". Arrows connect these events, showing the progression from one step to the next. This representation demonstrates the ideal scenario where a UE 802 moves from a legacy network to a modern network, with all relevant information being updated appropriately.

The middle section of FIG. 8 presents two parallel scenarios where VLR information may persist due to unexpected circumstances. This section is divided into two parts: Scenario 2A and Scenario 2A. In Scenario 2A, labeled "VLR info Persists Due to Loss of Coverage", the diagram replicates the timeline and network icons from Section 1. However, the sequence of events below the timeline differs. It shows "3G Registration", followed by "Loss of Coverage" (indicated by a small "x" icon), then "5G Registration", and finally "VLR Info Persists". This Scenario 2A illustrates a situation where the UE 802 loses network coverage before it may properly deregister from the 3G network, resulting in outdated VLR information remaining in the system. Scenario 2B, labeled "VLR info Persists Due to Battery Depletion", follows a similar pattern but replaces "Loss of Coverage" with "Battery Depletes" (represented by a small battery icon). Scenario 2B depicts another common cause of VLR information persistence, where the UE 802 battery dies before it may complete the deregistration process from the legacy network.

The bottom section of FIG. 8 illustrates the steps taken to resolve the persistent VLR information issue when the UE 802 registers on the 5G network. This section shows a large box labeled "5G Network 806", containing smaller boxes representing various network components: UE 802 (depicted as a smartphone icon), AMF 808 (Access and Mobility Management Function), UDM 810 (User Data Management), HLR 812 (Home Location Register), and Network Interworking Support Database 814 (represented by a database icon). Outside the 5G Network box, a cloud labeled "Legacy Network 816" contains a box labeled "VLR 818" (Visitor Location Register). The diagram uses arrows to depict the flow of actions in the resolution process: UE 802 sends a "Registration Request" to AMF 808, AMF 808 forwards a "Registration Notification" to UDM 810, UDM 810 performs a "Check VLR Info" query on Network Interworking Support Database 814, UDM 810 then sends a "Deregistration Request" to HLR 812, HLR 812 proceeds to "Clear VLR Info" in Network Interworking Support Database 814, and finally, HLR 812 sends a "Cancel Location" message to VLR 818 in the Legacy Network 816.

Figure 9:
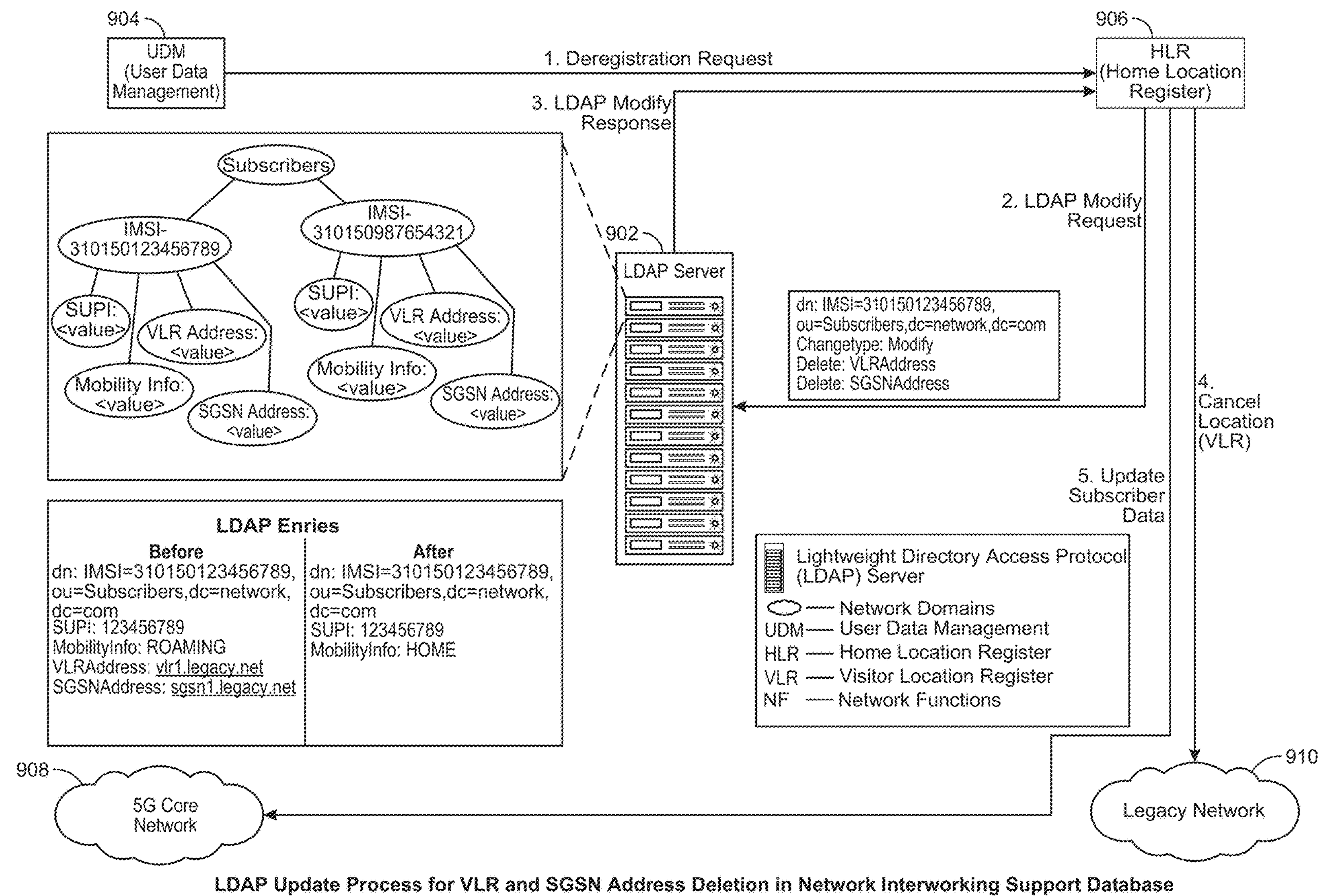
FIG. 9 presents an example detailed technical illustration of a database update process for managing subscriber information across different network technologies.

FIG. 9 presents an example detailed technical illustration of a Lightweight Directory Access Protocol (LDAP) update process for Visitor Location Register (VLR) and Serving GPRS Support Node (SGSN) address deletion in a network interworking support database. This figure provides an example view of components and processes involved in maintaining accurate subscriber information across different network generations. The center of FIG. 9 features a large server rack labeled "LDAP Server 902". This central element represents the core repository for subscriber data, playing a role in enabling interoperability between different network technologies. Surrounding the LDAP Server 902, the diagram depicts various network functions and elements that interact with it during the update process. On the top-left, a box labeled "UDM 904" (User Data Management) is shown, representing a component of the 5G core network responsible for managing subscriber data. To the top-right, a box labeled "HLR 906" (Home Location Register) is depicted, illustrating the continued relevance of this legacy network element in modern network architectures. At the bottom-left of the diagram, a cloud shape labeled "5G Core Network 908" represents the broader ecosystem of the latest generation mobile network. Similarly, at the bottom-right, another cloud shape labeled "Legacy Network 910" symbolizes the older network infrastructure that must still be accounted for in interworking scenarios.

Within the LDAP Server 902, on the left side, the diagram provides a magnified view of the LDAP directory structure. This tree-like hierarchy illustrates how subscriber information is organized and stored. The root node is labeled "Subscribers", under which child nodes for different IMSIs (International Mobile Subscriber Identities) are shown. For example, the diagram displays entries like "IMSI-310150123456789" and "IMSI-310150987654321". Under each IMSI node, the diagram shows attributes such as "SUPI: <value>", "Mobility Info: <value>", "VLR Address: <value>", and "SGSN Address: <value>". This detailed representation provides insight into the structure and content of the subscriber data stored in the LDAP Server 902. The LDAP Server 902 update process is illustrated through a series of numbered arrows and labels, depicting the flow of actions and data during the VLR and SGSN address deletion procedure. The first arrow, labeled "1. Deregistration Request", extends from UDM 904 to HLR 906. This represents the initiation of the update process, triggered when a UE (User Equipment) returns to its home network after roaming. Adjacent to this arrow, a text box details the LDAP operation, showing the specific command used to modify the subscriber's entry. The LDAP operation specifies the exact changes to be made to the subscriber's record, namely the deletion of the VLR and SGSN address information. The operation includes the following details: dn: IMSI=310150123456789,ou=Subscribers,dc=network, dc=com, changetype: modify, delete: VLRAddress, and delete: SGSNAddress.

The second arrow, labeled "2. LDAP Modify Request", connects HLR 906 to LDAP Server 902. This arrow represents the HLR forwarding the modification request to the LDAP Server 902, initiating the actual update of the subscriber data. A third arrow, labeled "3. LDAP Modify Response", flows back from LDAP Server 902 to HLR 906, indicating the server's acknowledgment of the successful update. Following this, two more arrows extend from HLR 906: one labeled "4. Cancel Location (VLR)" points to the Legacy Network 910 cloud, while another labeled "5. Update Subscriber Data" points to the 5G Core Network 908 cloud. These arrows illustrate the HLR's role in ensuring consistency across different network elements by propagating the updated information. To further clarify the effects of the update process, FIG. 9 includes a side-by-side comparison of LDAP entries before and after the update. The "Before" entry shows dn: IMSI=310150123456789, ou=Subscribers,dc=network,dc=com, SUPI: 123456789, MobilityInfo: ROAMING, VLRAddress: vlr1.legacy.net, and SGSNAddress: sgsn1.legacy.net. The "After" entry displays the same information with the VLRAddress and SGSNAddress fields removed, showing only dn: IMSI=310150123456789,ou=Subscribers,dc=network, dc=com, SUPI: 123456789, and MobilityInfo: HOME. This before-and-after comparison effectively demonstrates the specific changes made to the subscriber's record as a result of the update process.

Lightweight Directory Access Protocol (LDAP) is a standardized application protocol for accessing and maintaining distributed directory information services over an Internet Protocol (IP) network. Originally designed as a lightweight alternative to the X.500 Directory Access Protocol (DAP), LDAP has become a widely adopted standard for directory services across various industries and applications. At its core, LDAP provides a method for organizing and accessing information in a hierarchical structure, making it particularly well-suited for storing and retrieving data that doesn't change frequently but needs to be accessed often. This characteristic has made LDAP a popular choice for storing user account information, network device configurations, and, in the context of telecommunications, subscriber data.

The LDAP directory structure is typically organized as a tree, with each node in the tree representing an entry. Each entry consists of a set of attributes, which are essentially key-value pairs that store specific pieces of information. The hierarchical nature of LDAP enables for efficient searching and retrieval of information, as well as the ability to represent complex organizational structures. In the telecommunications industry, this hierarchical structure may be leveraged to represent the various levels of subscriber information, from high-level network identifiers down to individual subscriber details.

While FIG. 9 presents one possible implementation of LDAP in a telecommunications context, it is noteworthy that actual implementations may vary significantly based on specific network requirements, operator preferences, and industry standards. For instance, the depth and breadth of the directory tree, the naming conventions used for entries, and the specific attributes stored for each subscriber may differ from one implementation to another. Some networks might choose to incorporate additional levels in the hierarchy to represent geographical regions or service types, while others might opt for a flatter structure with more emphasis on attribute-based organization.

In LDAP terminology, "dn" stands for Distinguished Name, which uniquely identifies an entry in the directory. The DN is composed of a sequence of Relative Distinguished Names (RDNs), each representing a level in the directory hierarchy. "ou" typically refers to Organizational Unit, often used to denote departments or divisions within an organization. In a telecom context, it may potentially be used to represent different subscriber groups or service types.

"dc" stands for Domain Component and is commonly used in representing domain names within the LDAP structure. In a telecom LDAP implementation, these components might be used differently or replaced entirely with industry-specific identifiers that better reflect the network's organizational structure.

SUPI, or Subscription Permanent Identifier, is a concept introduced in 5G networks to provide a secure and privacy-preserving way of identifying subscribers. It replaces the IMSI (International Mobile Subscriber Identity) used in earlier generations of mobile networks for long-term subscriber identification. The SUPI is typically not transmitted over the air, instead using a derived temporary identifier to enhance subscriber privacy. Mobility Info in the context of mobile networks refers to information about the subscriber's current status within the network, such as whether they are actively connected, in an idle state, or roaming on a partner network. This information is helpful for managing subscriber sessions and routing incoming calls or data.

VLR (Visitor Location Register) address and SGSN (Serving GPRS Support Node) address may both be elements in managing subscriber mobility across different network technologies. The VLR address typically points to the VLR currently serving the subscriber in circuit-switched networks (like 2G and 3G), storing temporary subscriber information for users roaming in its associated network area. The SGSN address, on the other hand, is relevant in packet-switched networks and points to the SGSN currently serving the subscriber, managing tasks such as packet routing and transfer, mobility management, and logical link management. In the context of an LDAP directory for a modern network supporting multiple generations of technology, storing both these addresses enables for efficient interworking between different network elements and ensures that subscriber information may be quickly accessed regardless of the type of network the subscriber is currently using.

The implementation of Lightweight Directory Access Protocol (LDAP) in telecommunications networks often seeks to balance the requirements for fast data retrieval, support for legacy systems, and the ability to incorporate new types of subscriber data as network technologies evolve. For example, as networks transition to 5G and beyond, the LDAP structure might need to accommodate new identifiers, additional security-related attributes, or information related to network slicing and service-specific parameters. Furthermore, the increasing focus on network function virtualization (NFV) and software-defined networking (SDN) in modern telecom infrastructures might influence how LDAP directories are implemented and accessed, potentially leading to more dynamic and flexible directory structures that may adapt to changing network configurations.

Figure 10:
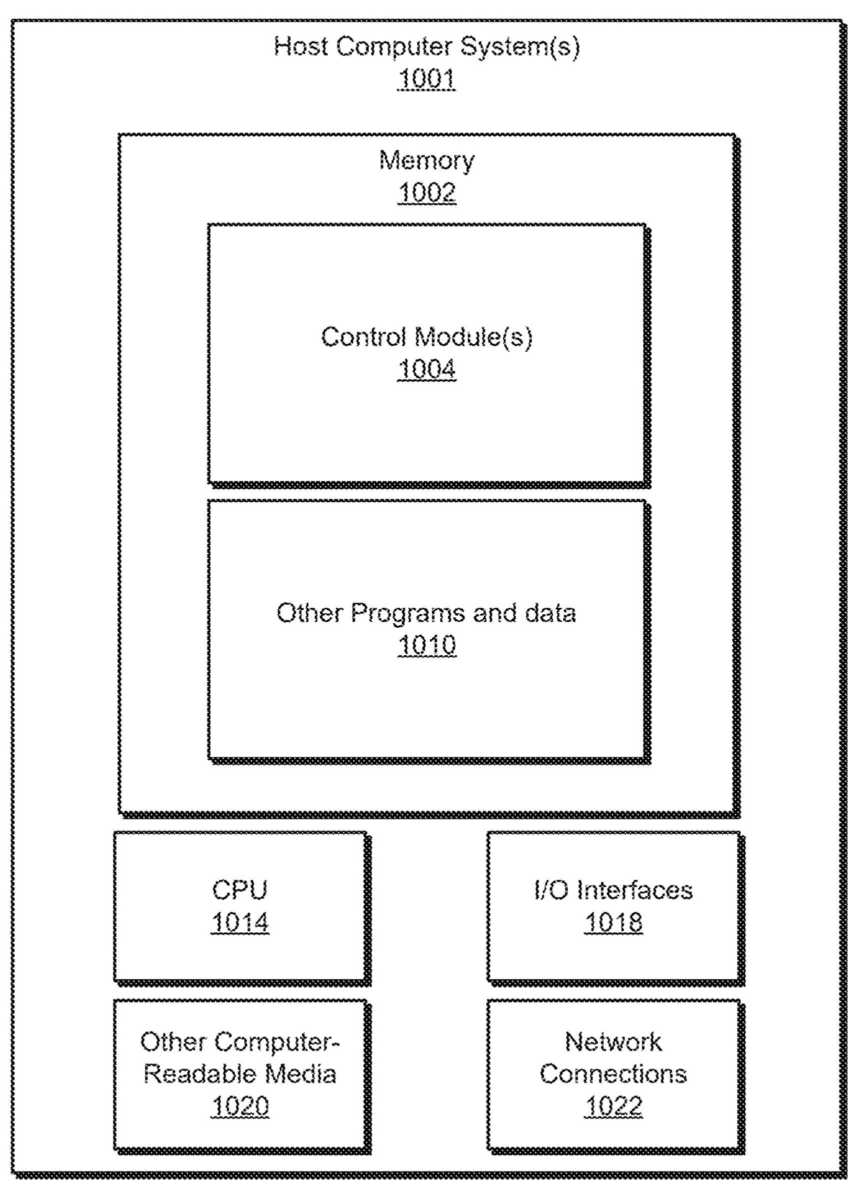
FIG. 10 shows an example diagram of a computing system that may facilitate the performance of one or more of the methods described herein.

FIG. 10 shows a system diagram that describes an example implementation of a computing system(s) for implementing embodiments described herein. The functionality described herein may be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, enabling higher deployment agility and flexibility. However, FIG. 10 illustrates an example of underlying hardware on which such software and functionality may be hosted and/or implemented.

In particular, shown is example host computer system(s) 1001. For example, such computer system(s) 1001 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1001 may include memory 1002, one or more central processing units (CPUs) 1014, I/O interfaces 1018, other computer-readable media 1020, and network connections 1022.

Memory 1002 may include one or more various types of non-volatile and/or volatile storage technologies. Examples of memory 1002 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1002 may be utilized to store information, including computer-readable instructions that are utilized by CPU 1014 to perform actions, including those of embodiments described herein.

Memory 1002 may have stored thereon control module(s) 1004. The control module(s) 1004 may be configured to implement and/or perform some or all of the functions of the systems or components described herein. Memory 1002 may also store other programs and data 1010, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1022 are configured to communicate with other computing devices to facilitate the functionality described herein. In various embodiments, the network connections 1022 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1018 may include a video interface, other data input or output interfaces, or the like. Other computer-readable media 1020 may include other types of stationary or removable computer-readable media, such as removable flash drives, external hard drives, or the like.

The various embodiments described above may be combined to provide further embodiments. These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

accessing, by a User Data Management (UDM) function of a mobile network, in response to receiving a registration request from a User Equipment (UE), a network interworking support database that supports interworking between the mobile network and a legacy network that operates using a mobile network standard for a specific subscriber in a roaming scenario that is of an earlier generation than the mobile network primarily uses for the specific subscriber;

determining, by the UDM function, whether the network interworking support database contains Visitor Location Register (VLR) information for the UE associated with the legacy network; and transmitting, by the UDM function based on determining that the network interworking support database contains VLR information for the UE associated with the legacy network, a deregistration request to a Home Location Register (HLR) of the mobile network such that the HLR clears the VLR information of the UE from the network interworking support database and sends a cancellation message to a VLR of the legacy network to remove registration information for the UE such that the mobile network avoids redirecting a call for the UE to the legacy network after the UE has returned to a coverage area of the mobile network after roaming in a coverage area of the legacy network.

2. The method of claim 1, wherein the registration request is received from an Access and Mobility Management Function (AMF) of the mobile network.

3. The method of claim 1, wherein accessing the network interworking support database comprises performing a database read operation to retrieve Subscriber Permanent Identifier (SUPI), mobility, Serving GPRS Support Node (SGSN), and VLR information.

4. The method of claim 1, wherein:

the mobile network comprises a 5G network; and the legacy network comprises a 3G network.

5. The method of claim 1, wherein the registration request comprises an IP Multimedia Subsystem (IMS) registration request.

6. The method of claim 5, further comprising performing an IMS registration for the UE after clearing the VLR information.

7. The method of claim 1, wherein the registration request comprises a location update request.

8. The method of claim 1, wherein the deregistration request comprises a NUDM_UECM_DeregistrationNotification including VLR information comprising a VLR number, a Local Mobile Subscriber Identity (LMSI), a Mobile Application Part (MAP) version, and a cancellation type.

9. The method of claim 1, wherein the cancellation message sent to the VLR comprises a Cancel Location message.

10. The method of claim 1, wherein the deregistration request prevents a Service Centralization and Continuity Application Server (SCC-AS) from performing a Terminating Access Domain Selection (T-ADS) query based on the cleared VLR information.

11. The method of claim 1, wherein clearing the VLR information prevents generation of a Provide Roaming Number (PRN) response for the UE.

12. The method of claim 1, wherein the method improves interworking between 5G and 3G networks.

13. The method of claim 1, further comprising updating a Home Subscriber Server (HSS) to reflect the cleared VLR information.

14. The method of claim 1, wherein the VLR information remains in the network interworking support database based on the UE failing to deregister from the legacy network due to loss of coverage or battery depletion.

15. The method of claim 1, wherein the VLR information remains in the network interworking support database based on a Mobile Switching Center (MSC) of the legacy network failing to send a purge request.

16. The method of claim 1, further comprising performing a Lightweight Directory Access Protocol (LDAP) update to delete VLR and SGSN address information from the network interworking support database.

17. A non-transitory computer-readable medium that has instructions stored thereon that, when executed by at least one physical computing processor, cause a computing device to perform operations comprising:

accessing, by a User Data Management (UDM) function of a mobile network, in response to receiving a registration request from a User Equipment (UE), a network interworking support database that supports interworking between the mobile network and a legacy network that operates using a mobile network standard for a specific subscriber in a roaming scenario that is of an earlier generation than the mobile network primarily uses for the specific subscriber;

determining, by the UDM function, whether the network interworking support database contains Visitor Location Register (VLR) information for the UE associated with the legacy network; and transmitting, by the UDM function based on determining that the network interworking support database contains VLR information for the UE associated with the legacy network, a deregistration request to a Home Location Register (HLR) of the mobile network such that the HLR clears the VLR information of the UE from the network interworking support database and sends a cancellation message to a VLR of the legacy network to remove registration information for the UE such that the mobile network avoids redirecting a call for the UE to the legacy network after the UE has returned to a coverage area of the mobile network after roaming in a coverage area of the legacy network.

18. The non-transitory computer-readable medium of claim 17, wherein the registration request is received from an Access and Mobility Management Function (AMF) of the mobile network.

19. A system comprising:

at least one physical computing processor of a computing device; and a non-transitory computer-readable medium that has instructions stored thereon that, when executed by the at least one physical computing processor, cause the computing device to perform operations comprising:

accessing, by a User Data Management (UDM) function of a mobile network, in response to receiving a registration request from a User Equipment (UE), a network interworking support database that supports interworking between the mobile network and a legacy network that operates using a mobile network standard for a specific subscriber in a roaming scenario that is of an earlier generation than the mobile network primarily uses for the specific subscriber;

determining, by the UDM function, whether the network interworking support database contains Visitor Location Register (VLR) information for the UE associated with the legacy network; and transmitting, by the UDM function based on determining that the network interworking support database contains VLR information for the UE associated with the legacy network, a deregistration request to a Home Location Register (HLR) of the mobile network such that the HLR clears the VLR information of the UE from the network interworking support database and sends a cancellation message to a VLR of the legacy network to remove registration information for the UE such that the mobile network avoids redirecting a call for the UE to the legacy network after the UE has returned to a coverage area of the mobile network after roaming in a coverage area of the legacy network.

20. The system of claim 19, wherein the registration request is received from an Access and Mobility Management Function (AMF) of the mobile network.

* * * * *